United States Patent
St. Maurice et al.

(10) Patent No.: US 6,418,473 B1
(45) Date of Patent: Jul. 9, 2002

(54) MULTIMEDIA CLENT AND SERVER

(75) Inventors: Susan T. St. Maurice, Carp; Thinh D. Nguyen, Kanata; Andrew J. Chalupka, Ottawa, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/315,042

(22) Filed: May 20, 1999

(51) Int. Cl.$^7$ .............................................. G06F 15/16
(52) U.S. Cl. .................. 709/231; 709/232; 709/233; 709/219; 709/217; 709/203
(58) Field of Search ................................ 725/9, 14, 35, 725/46, 50; 709/203, 217, 231, 232, 233; 370/390; 348/461

(56) References Cited

U.S. PATENT DOCUMENTS

| | | | |
|---|---|---|---|
| 4,258,386 A | | 3/1981 | Cheung ........................ 358/84 |
| 5,367,329 A | * | 11/1994 | Nakagaki et al. ............... 348/1 |
| 5,444,499 A | * | 8/1995 | Saitoh ........................ 348/734 |
| 5,559,549 A | * | 9/1996 | Hendricks et al. ............. 348/6 |
| 5,727,002 A | * | 3/1998 | Miller et al. ................. 714/748 |
| 5,801,753 A | * | 9/1998 | Eyer et al. ..................... 725/50 |
| 5,844,620 A | * | 12/1998 | Coleman et al. ............. 348/461 |
| 5,861,906 A | * | 1/1999 | Dunn et al. ..................... 348/7 |
| 5,894,589 A | * | 4/1999 | Reber et al. ..................... 455/2 |
| 5,940,391 A | * | 8/1999 | Malkin et al. ............... 370/390 |
| 5,974,299 A | * | 10/1999 | Massetti ......................... 455/2 |

FOREIGN PATENT DOCUMENTS

| | | |
|---|---|---|
| EP | 0 594 350 A | 4/1994 |
| EP | 0 725 538 A | 8/1996 |
| WO | 98/28906 A | 7/1998 |

OTHER PUBLICATIONS

Real Time Transport Protocol (RTP) Session Manager, Online, XP–002145863, Nov. 5, 1997, pp. 1–9.

* cited by examiner

*Primary Examiner*—Moustafa M. Meky
*Assistant Examiner*—Abdullahi E. Salad
(74) *Attorney, Agent, or Firm*—Allan P. Millard

(57) ABSTRACT

A server provides a channel for previewing multimedia and a plurality of full screen multimedia channels. A client displays plural preview screens representing available multimedia channels from the server. Selection of a particular one of the plural preview screens at the client signals the server of the desired channel. The server then initiates streaming of the desired channel to the client. The server tracks the address of the user, the name of the stream and when the clip was started. After the client is finished viewing the stream another TCP connection is made to the server to unsubscribe. The server can therefore keep track of who has viewed which streams, for how long and at what time of the day. This method of tracking could also be used to track preview viewing.

14 Claims, 5 Drawing Sheets

MULTIMEDIA CLIENT AND SERVER

FIELD OF THE INVENTION

The present invention relates to a multimedia client and server is particularly concerned with allowing selection of desired multimedia.

BACKGROUND OF THE INVENTION

It is known within internetworking arrangements to provide multimedia services from servers to clients. Various Internet standards track protocols address both unicast and multicast streaming of audio-video data from servers to clients. The advantages of multicasting are well known. For example, a live news conference can be streamed to hundreds of viewers using multicasting to minimize the bandwidth needed to convey the data from the server to the clients by sending only a single stream of data over common links. Thus, multicasting of audio and video data or multimedia data enhances the capability of servers to provide a variety of multimedia to end-users. However there is a need to effectively use this capability. For example, when video streams are chosen by selecting from lists or still pictures the end user may, once viewing the video stream, realize that the material is not what was desired. A more effective way of selecting such multimedia is needed to reduce the impact on the networks caused by initiating and then prematurely stopping the multicast stream to a particular client or clients.

SUMMARY OF THE INVENTION

An object of the present invention is to provide an improved multimedia client and server.

According to the present invention, a server provides a channel for previewing multimedia and a plurality of full screen multimedia channels; and a client displays plural preview screens at a lower rate and using less bandwidth than the full screen, almost full frame rate, higher quality multicast single stream channel. Selection of a particular one of the plural preview screens at the client signals the server of the desired channel. The server then records the time of streaming of the desired channel to the client.

Conveniently, the preview screen and full screen displays may be implemented by one of two methods. In the first method, a plurality of multicast streams is sent out into the network to a predetermined multicast address. In a first method, the preview screen is derived, by the client, from the plurality of multicast streams. In the second method, a separate preview channel is sent to a client, via unicast, at a lower frame rate than the multicast channel.

Preferably the multimedia channels are Internet Protocol multicast channels.

Advantages of the present invention include providing a client with a more intuitive user interface and a server with a capability of monitoring client selection and usage of available full screen multicast streams. This allows the service to track highly viewed content thereby allowing better tuning or targeting of what to stream to customers; remove less played streams and direct content to the right audience.

BRIEF DESCRIPTION OF THE DRAWINGS

The present invention will be further understood from the following detailed description, with reference to the drawings in which.

DETAILED DESCRIPTION

Figure 1:
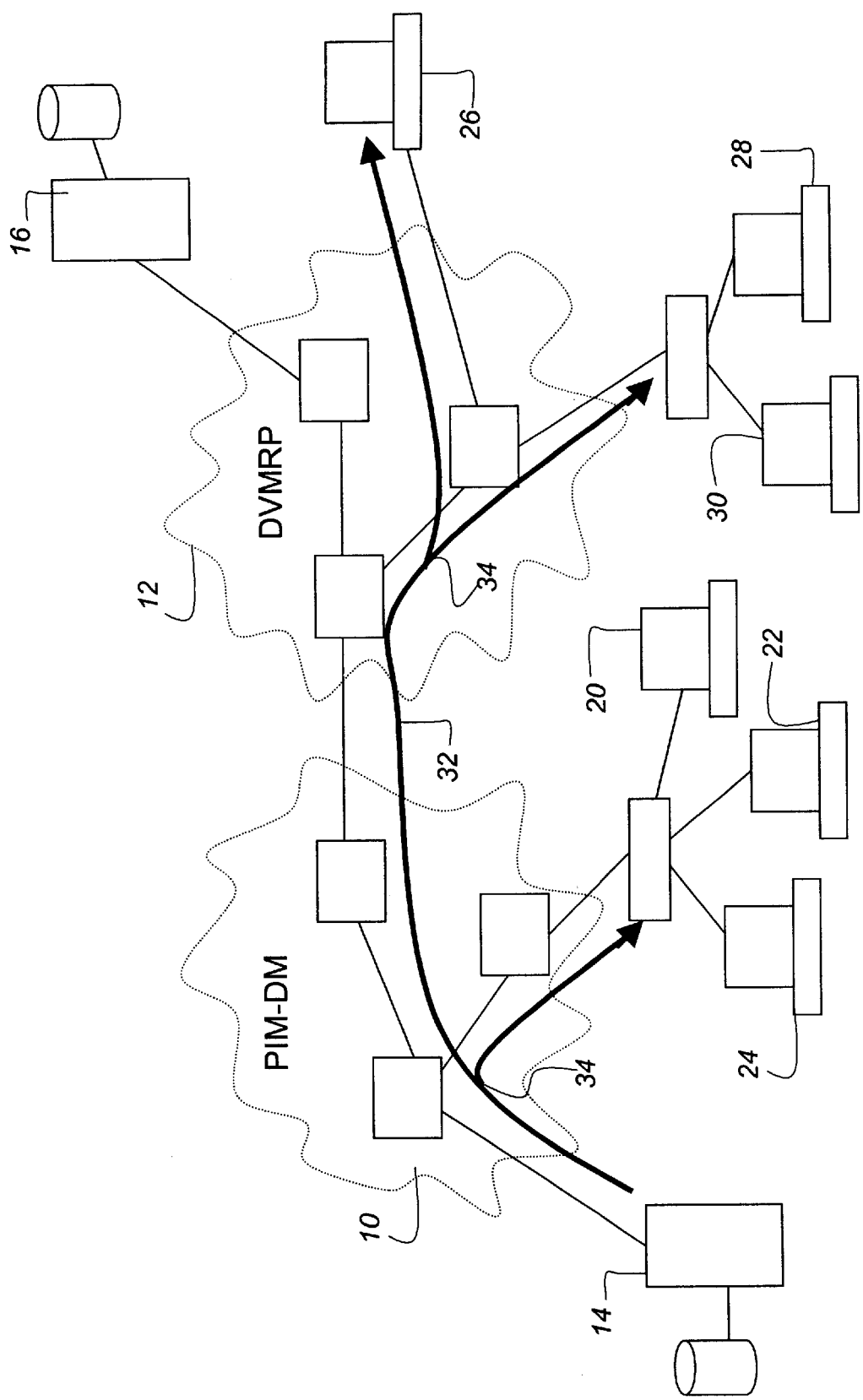
FIG. 1 illustrates a representative portion of an internetworking arrangement capable of multicasting and including a server in accordance with an embodiment of the present invention.

Referring to FIG. 1 a representative portion of an internetworking arrangement capable of multicasting and including a server in accordance with an embodiment of the present invention. The internetworking arrangement includes first and second networks 10 and 12, each implementing a different form multicasting. The first network 10 implements protocol independent multicast—sparse mode (PIM-SM). The second network 12 implements distance vector multicast routing protocol (DVMRP). A first server 14 is linked to the PIM-SM network and embodies a software module for providing a preview channel to a client to allow an end-user to select a multicast channel from a plurality of previews presented on the client. A second server 16 linked to the second network 12 may provide conventional multicast video and audio streams to end-users. The preview and full screen multicast video and audio streams need not be on separate servers 14 and 16. Clients 20, 22, 24, 26, 28, and 30 represent end-user that may access multicast video or audio from servers 14 or 16.

In operation, a typical multicast is provided by a server, in FIG. 1 first server 14, via multicast networks, for example networks 10 and 12 to end-user clients 20, 22, 24, 26, 28, and 30. Solid lines 32, paralleling network links, represent a single stream of data spanning the network. This is done in multicasting to reduce bandwidth compared to using a unicast stream to individually stream from the server to each client by streaming only a single stream over common paths through the networks. At branches 34, replication of the data stream occurs to provide each downstream branch with its own data stream.

Figure 2:
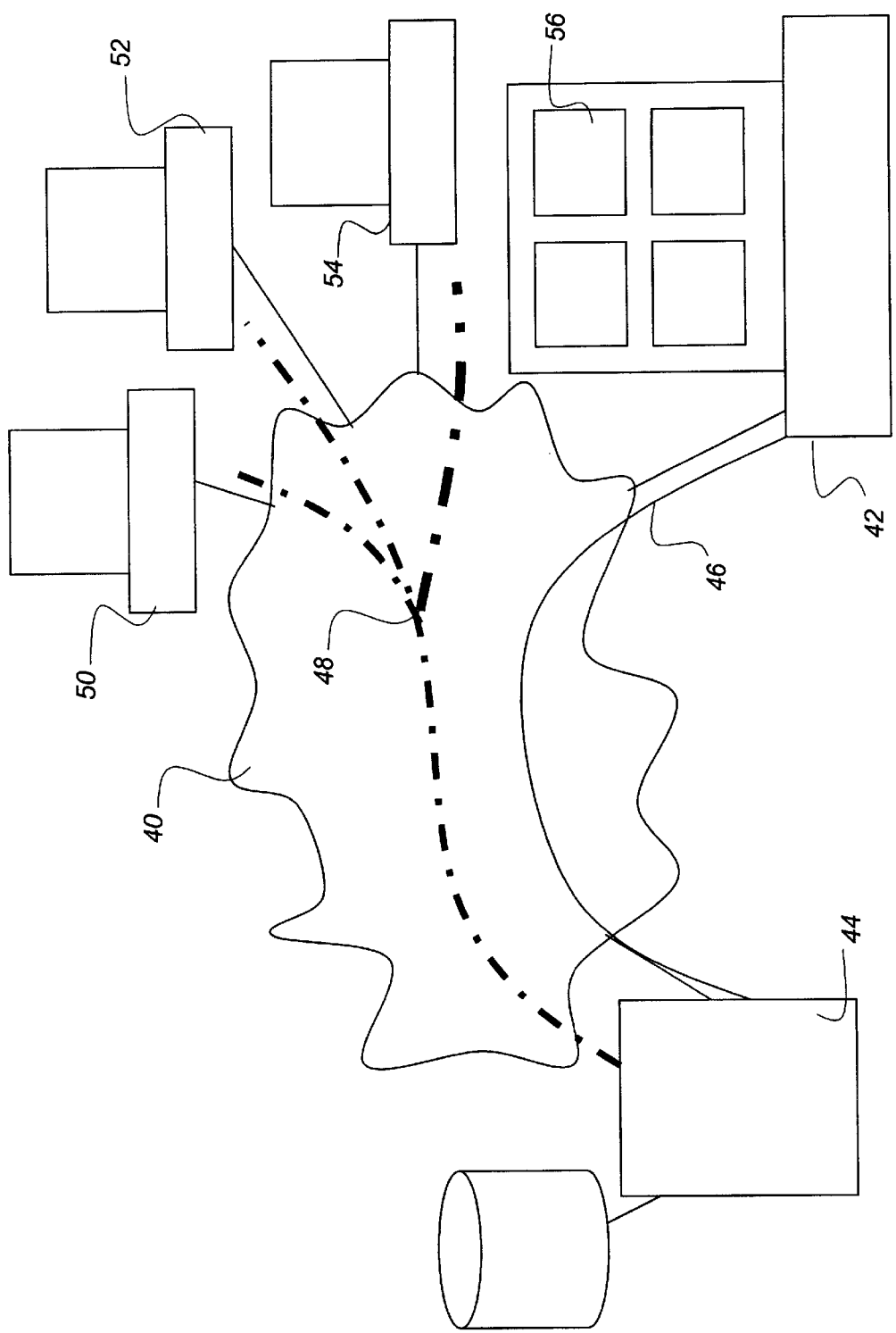
FIG. 2 illustrates an IP network including a client and server in accordance with an embodiment of the present invention.

Referring to FIG. 2 there is illustrated an IP network 40 including a client 42 and server 44 in accordance with an embodiment of the present invention. The server 44 includes a server software module that allows the server to send clients a preview channel 46, in addition to a full screen multicast channel 48. The multicast channel 48 is replicated within the IP network 40 and delivered to end-users represented by terminals 50, 52, and 54. If PC's 50 & 52 are on the same subnet/hub only 1 stream will be sent on the wire and only the PCs that wish to view the multicast stream will choose to receive it. The preview channel 46 is unicast from the server 44 to the client 42. The preview channel 46 carries a stream of several low rate multimedia applications to the client 42. The client 42 includes a software module that allows the client 42 to receive the preview channel 46 and display a plurality of preview screens 56.

In operation, a preview application in the server 44 streams the unicast preview channel 46 to the client 42. An end-user is then able to select a desired full screen multicast channel by, for example double clicking on the desired preview screen. The section causes the client 42 to join the multicast group corresponding to the desired media stream. The server 44 collects information on the desired media stream and may derive a viewing time by recording a start time and on termination of the desired stream, a stop time.

In this way the service provider server 44 is able to collect data on user habits with regard to the plurality of streams being previewed. The streams offered via the preview channel may then be modified based upon usage patterns that relate to time of day, day of week, weekend, holidays and so on.

Figure 3:
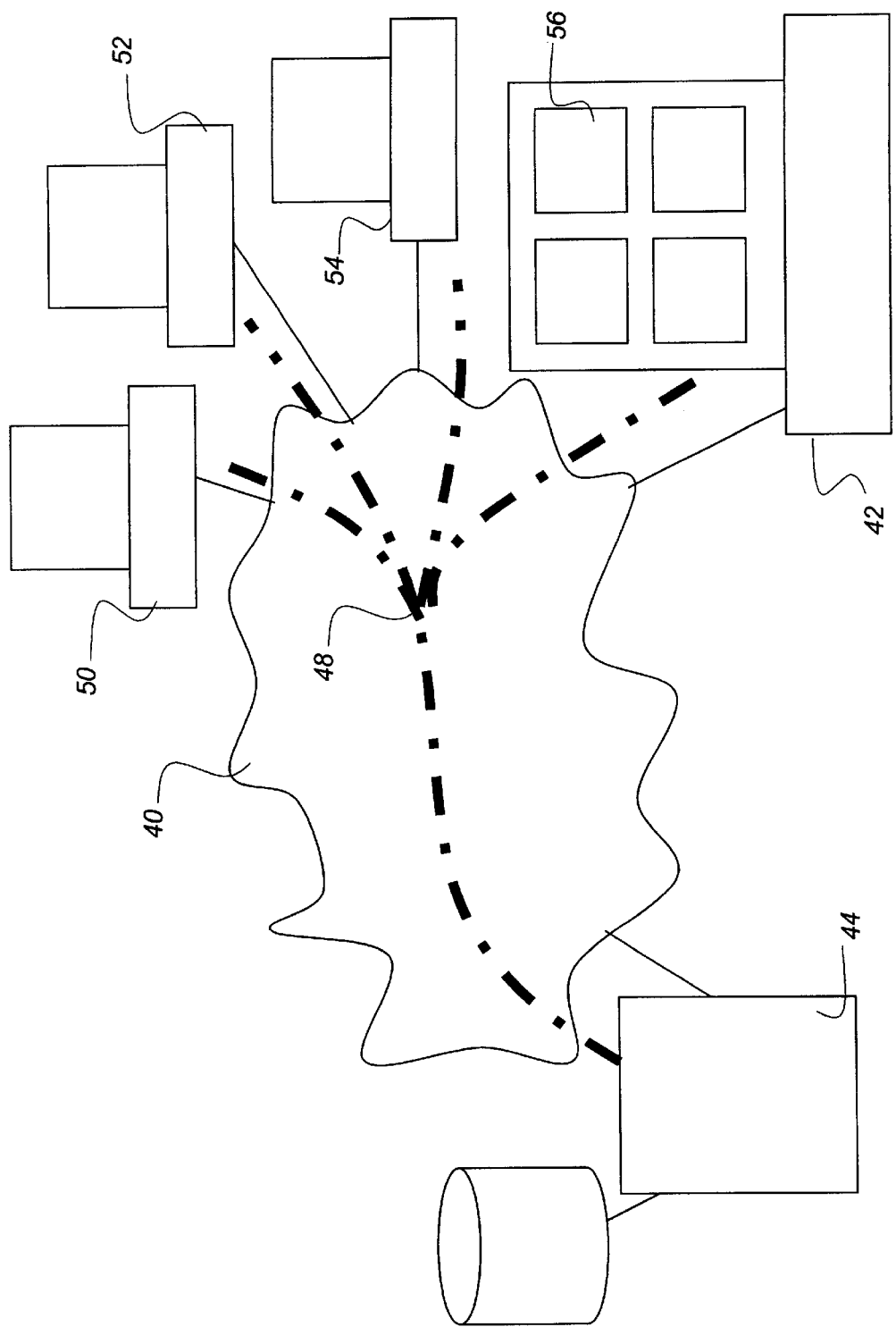
FIG. 3 illustrates an implementation of a client in accordance with an embodiment of the present invention.

Referring to FIG. 3 there is illustrated an implementation of a server and client, respectively. In the implementation of FIG. 3, the preview channel 46 is created by the client 42 receiving existing streams from the server. A prototype was implemented as follows: the server continuously sends four multicast streams out to the network to the same multicast address (regardless of whether any clients are listening or not). When a user chooses to play the preview channel, the video components of the four streams are displayed in a 4-panel preview channel window. When the client selects one of these to view as full-screen, the client displays a larger version of the selected video component while playing the audio component simultaneously. The other three content streams are still present on the network, the client is simply ignoring them (actually, the packets are being discarded at the UDP layer). In other words, the preview channel is not a separate stream sent by the server; it is the responsibility of the client software to build the preview channel from all available streams.

Figure 4:
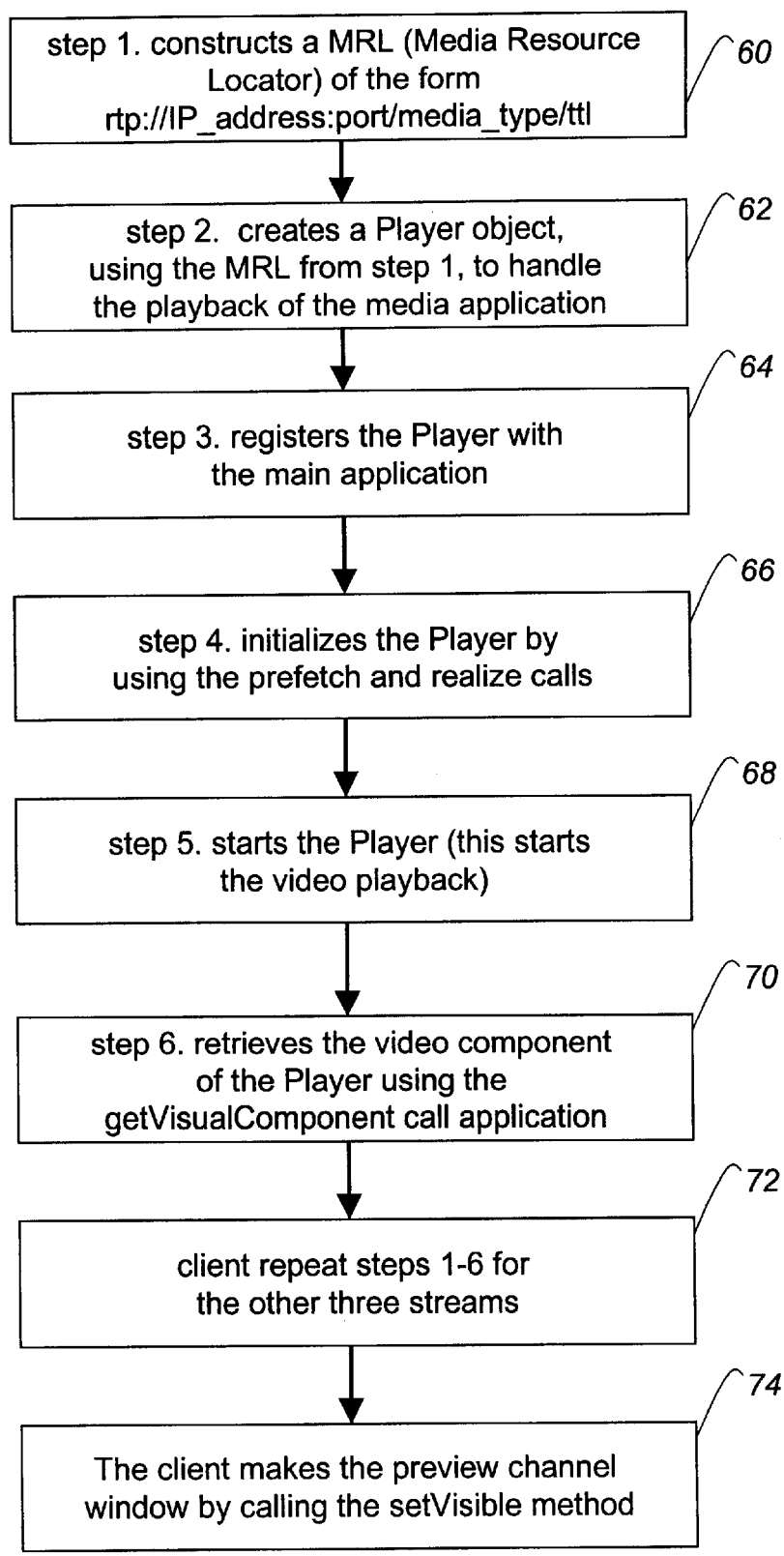
FIG. 4 illustrates in a flow chart the method of providing a preview channel for the client of FIG. 3.
Figure 5:
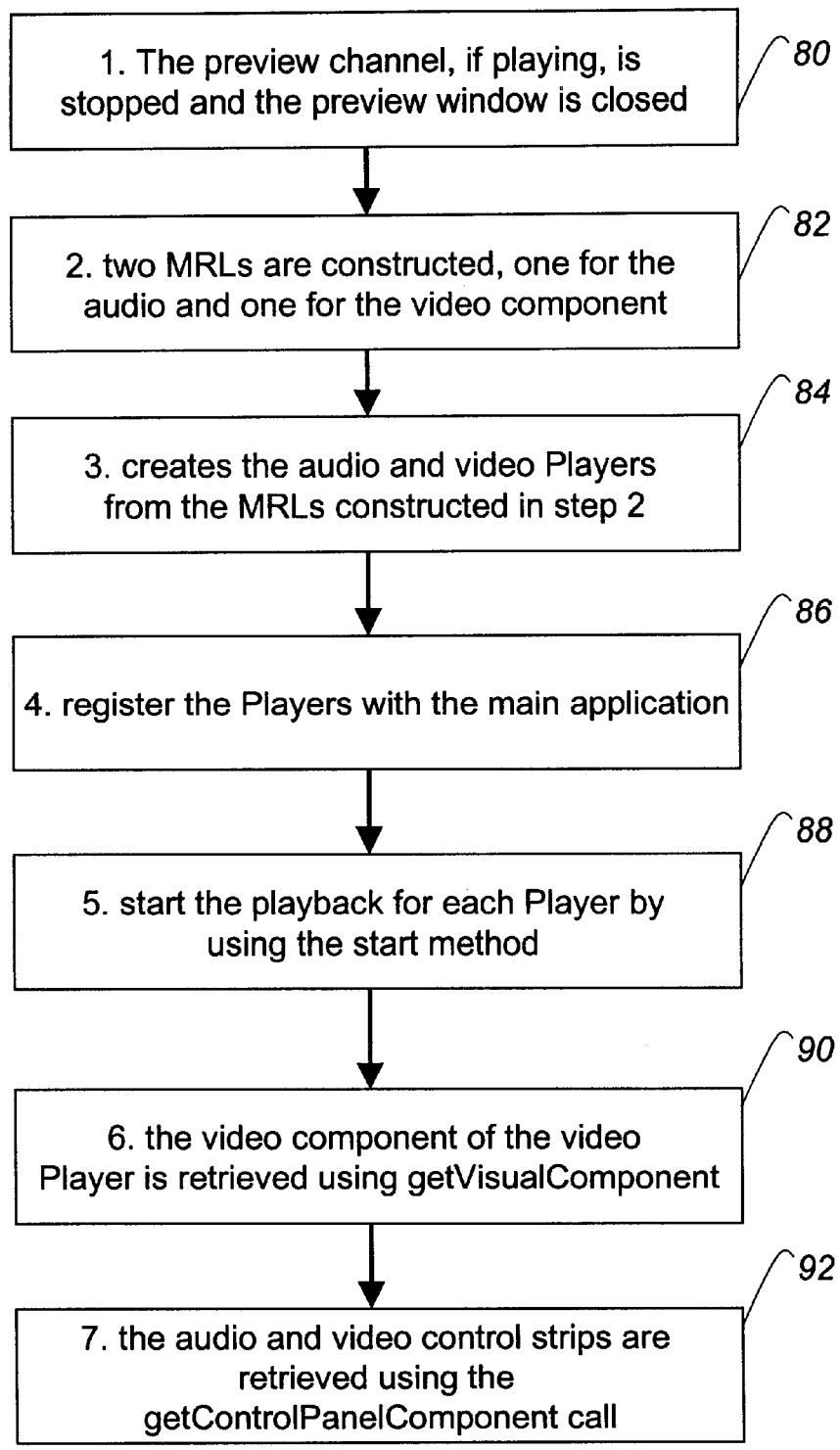
FIG. 5 illustrates in a flow chart the method of selecting a multicast channel for the client of FIG. 3.

Referring to FIGS. 4 and 5 there are illustrated in flow charts the method of providing a preview channel and the method of selecting a multicast channel for the client of FIG. 3.

Below are the steps taken by the client software to display both the preview channel and the full-screen channels. The client software does the following to play the preview channel. Standard JMF (Java Media Framework) method calls are used for the bulk of the work:

Referring to FIG. 4. the client: at step 1. constructs a MRL (Media Resource Locator) of the form rtp://$IP_{13}$ address:port/media$_{13}$ type/ttI as represented in a block 60.

The client at step 2. creates a Player object, using the MRL from step 1, to handle the playback of the media application, as represented in a block 62;

The client at step 3. registers the Player with the main application, as represented in a block 64.

The client at step 4. initializes the Player by using the prefetch and realize calls, as represented in a block 66.

The client at step 5. starts the Player (this starts the video playback), as represented in a block 68.

The client at step 6. retrieves the video component of the Player using the getVisualComponent call application, as represented in a block 70. This is inserted into the preview channel window (which uses GridLayout as a Layout Manager).

The client repeat steps 1–6 for the other three streams, as represented in a block 72. The video component of the first stream goes into the top left corner of the preview window. The second stream's video component goes into the top right. The third stream's video component goes in the bottom left corner, the fourth in the bottom right.

The client makes the preview channel window by calling the setVisible method, as represented in a block 74;

Referring to FIG. 5. when an end user at the the client selects a stream, e.g. by double-clicking on the appropriate preview stream in the preview channel window, the following steps take place within the client:

1. The preview channel, if playing, is stopped and the preview window is closed, as represent by a block 80.

2. two MRLs are constructed, one for the audio and one for the video component, as represent by a block 82.

3. creates the audio and video Players from the MRLs constructed in step 2, as represent by a block 84.

4. register the Players with the main application, as represent by a block 86.

5. start the playback for each Player by using the start method (this automatically will prefetch and realize the Players), as represent by a block 88.

6. the video component of the video Player is retrieved using getVisualcomponent, as represent by a block 90. This is inserted into the media panel of the main ProtoView window.

7. the audio and video control strips are retrieved using the getcontrolPanelComponent call, as represent by a block 92. The video control strip is inserted above the media panel. The audio control strip is inserted below the media panel.

The client's preferences are tracked using 2 ports for TCP unicast; 1 for subscription and 1 for unsubscribing (1 port, known as the "subscribe" port is used to track when a client starts watching a stream. The other port, known as the "unsubscribe" port, tracks when a client stops watching a stream).

The client's preferences are tracked using two ports for TCP unicast; one for subscription and one for unsubscribing. (One port, known as the "subscribe" port is used to track when a client starts watching a stream. The other port, known as the "unsubscribe" port, tracks when a client stops watching a stream). Once the client receives the preview channel and selects the stream they wish to receive at full screen, full rate by double clicking, the client connects to sub port and sends the name of the clip and then disconnects. The server tracks the address of the user, the name of the stream and when the clip was started. After the client is finished viewing the stream another TCP connection is made to the server to unsubscribe. The server can therefore keep track of who has viewed which streams, for how long and at what time of the day. This method of tracking could also be used to track preview viewing. The log file is created when the server is started using: protoserv [logfile] [number of streams] ie./ protoserv log.htmI 8. After the log files are created this information could be plotted to give the content provider some insight in to what is being viewed.

What is claimed is:

1. In a data network supporting multicasting, a method of providing multimedia data via the network to an end user comprising the steps of:
   a. providing a plurality of preview streams in a unicast channel;
   b. responsive to a selection of one of the plurality of preview streams, providing a multicast multimedia steam corresponding thereto; and
   c. monitoring end user preference in dependence upon a preview selection;
   wherein the unicast preview channel is received by a client at a first data rate and the multicast multimedia stream is received at a second data rate;
   and wherein the second data rate is faster than the first data rate.

2. A method as claimed in claim 1 further including the step of modifying the plurality of preview streams based on determined usage of a selected multicast multimedia stream.

3. A method as claimed in claim 1 wherein the plurality of preview streams originate from a first server and the multicast media stream originates from a second server.

4. A method as claimed in claim 3, wherein the step of providing a plurality of preview streams comprises:
   a. receiving the unicast preview channel from the first a server;
   b. displaying the plurality of preview streams carried in the unicast preview channel.

5. A method as claimed in claim 1 wherein the step of providing a multicast multimedia stream comprises:
   a. double clicking on a desired preview stream;
   b. responsive to the selection, joining a multicast group corresponding to the desired multicast multimedia stream.

6. A method as claimed in claim 1 wherein the step of monitoring includes the step of determining the usage of the multicast multimedia stream.

7. A method as claimed in claim 6 wherein the step of determining the usage of the multicast multimedia stream includes the step of recording a start time corresponding to a time of day when the selection was made and recording an end time corresponding to the time of day when the selection was terminated.

8. In a data network supporting multicasting, a system for providing multimedia data via the network to an end user comprising:
   a. means for providing a unicast preview channel comprising a plurality of preview streams;
   b. means for providing a multicast multimedia stream; and
   c. a client communicating with the means for providing a unicast preview channel and the means for providing a multicast multimedia stream;
   wherein the unicast preview channel is received by the client at a first data rate and the multicast multimedia stream is received at a second data rate; and wherein the second data rate is faster than the first data rate.

9. The system of claim 8 wherein the first server further includes means for modifying the plurality of preview streams based on determined usage of a selected multicast multimedia stream.

10. The system of claim 8 wherein the plurality of preview streams originate from a first server and the multicast media stream originates from a second server.

11. The system of claim 10 wherein the first server comprises:
   a. a software module for providing the unicast preview channel comprising a plurality of preview streams;
   b. a monitor for recording end user preference in dependence upon a preview stream selection.

12. The system of claim 11 wherein the monitor includes a memory for recording times of selection and termination of the preview stream selection.

13. The system of claim 11 wherein the monitor comprises:
   a. a first port for tracking when an end user has started watching a selected multicast multimedia stream;
   b. a second port for tracking when an end user has stopped watching the selected multicast multimedia stream; and
   c. a memory for recording the start and stop times tracked by the first and second ports.

14. The system of claim 10 wherein the second server comprises:
   a. a memory for storing a plurality of multimedia streams; and
   b. a port for transmitting a multimedia channel carrying a selected one of the plurality of multimedia streams.

* * * * *